United States Patent [19]

Brown

[11] 3,956,901
[45] May 18, 1976

[54] SEWER LAYING SYSTEM

[76] Inventor: William R. Brown, Rte. 3, Box 125 R6, Post Falls, Idaho 83854

[22] Filed: Sept. 26, 1974

[21] Appl. No.: 506,133

[52] U.S. Cl. .............................. 61/72.1; 61/41 A; 61/72.5; 61/63; 214/1 PA; 214/1 PB; 214/85
[51] Int. Cl.² ........................ E02F 5/10; F16L 1/00; B65G 13/00
[58] Field of Search.................. 61/72.1, 72.5, 72.7, 61/72.2, 63; 214/1 PA, 85, 1 PB; 404/106; 193/2

[56] References Cited
UNITED STATES PATENTS

| | | |
|---|---|---|
| 2,763,236 | 9/1956 | Cummings .......................... 214/1 P |
| 3,034,668 | 5/1962 | Wicks .............................. 214/1 PA |
| 3,565,269 | 2/1971 | Martin ............................ 61/72.5 X |
| 3,820,345 | 6/1974 | Brecht ................................ 61/72.1 |

*Primary Examiner*—Jacob Shapiro
*Attorney, Agent, or Firm*—John W. Kraft; Charles L. Kraft, II

[57] ABSTRACT

The sewer laying system comprises a tile carrying and service unit operable to provide pressure for operation of the tile setting apparatus, to carry pallets of tile, to discharge individual tile sections into the area of the ditchline occupied by the tile setting apparatus, to receive and process aggregate which may be material cut from the ditchline itself, and to discharge specially classified material to the tile setting apparatus and other aggregates to backfill the ditchline.

34 Claims, 8 Drawing Figures

SEWER LAYING SYSTEM

FIELD OF INVENTION

The present invention relates to apparatus for mechanically laying tile, which may propel itself along a ditchline.

DESCRIPTION OF THE PRIOR ART

The tile and aggregate feeding function is a logistical process of unloading tiles from a supply stack and lowering them in the hole, and feeding tile from the digger to the tile setting housing. Apparatus for feeding tile have included various types of cranes, winches, lifts, and shoes, associated with either the digging apparatus or the tile setting housing. Characteristically, tile is fed to the housing from specially arranged stacks and chute guideways. The prior art does not appear to exploit the use of conventional tile pallets provided by tile manufacturers. Aggregate feeding means for material coming from the ditchline have characteristically employed only simple conveyers and chutes to move dirt rearwardly of the housing to be graded by other auxiliary equipment at some other time. It is noted in the prior art that special hoppers, chutes, and the like are provided for loading barrow aggregates processed in batch plants and stock piles outside of the ditchline. Ditchline aggregates are usually ignored as a source of cover fill adjacent the tile itself. Almost uniformly, aggregate feeding and tile feeding means, both in and around the housing, are fabricated as independent apparatus including separate framing, housing, and prime movers.

It is a primary object of this invention to provide tile and aggregate feeding apparatus which may feed tile from conventional tile pallets, may feed and classify aggregate finds from a trench digger to be fed into the tile setting apparatus of this invention, and may be self-propelled with means for grading aggregates to the ground line of the trench.

These and other objects shall become apparent from the description following, it being understood that modifications may be made without affecting the teachings of the invention here set out.

SUMMARY OF THE INVENTION

The sewer laying system comprises a tile carrying and service unit operable to provide pressure for operation of the tile setting apparatus, to carry pallets of tile, to discharge individual tile sections into the area of the ditchline occupied by the tile setting apparatus, to receive and process aggregate which may be material cut from the ditchline itself, and to discharge specially classified material to the tile setting apparatus and other aggregates to backfill the ditchline. The tile carrying and service unit includes a chassis; a main source of power having a pressure pump means; a pair of pipe bays operable to receive rectilinearly disposed pallets of pipe sections; aggregate handling group; and a boom group which includes a boom disposed into the ditchline cavity, a roller bed conveying individual pipe sections from the pipe base into the ditchline cavity, and means for conveying aggregate material from the aggregate handling group to the tile setting apparatus.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
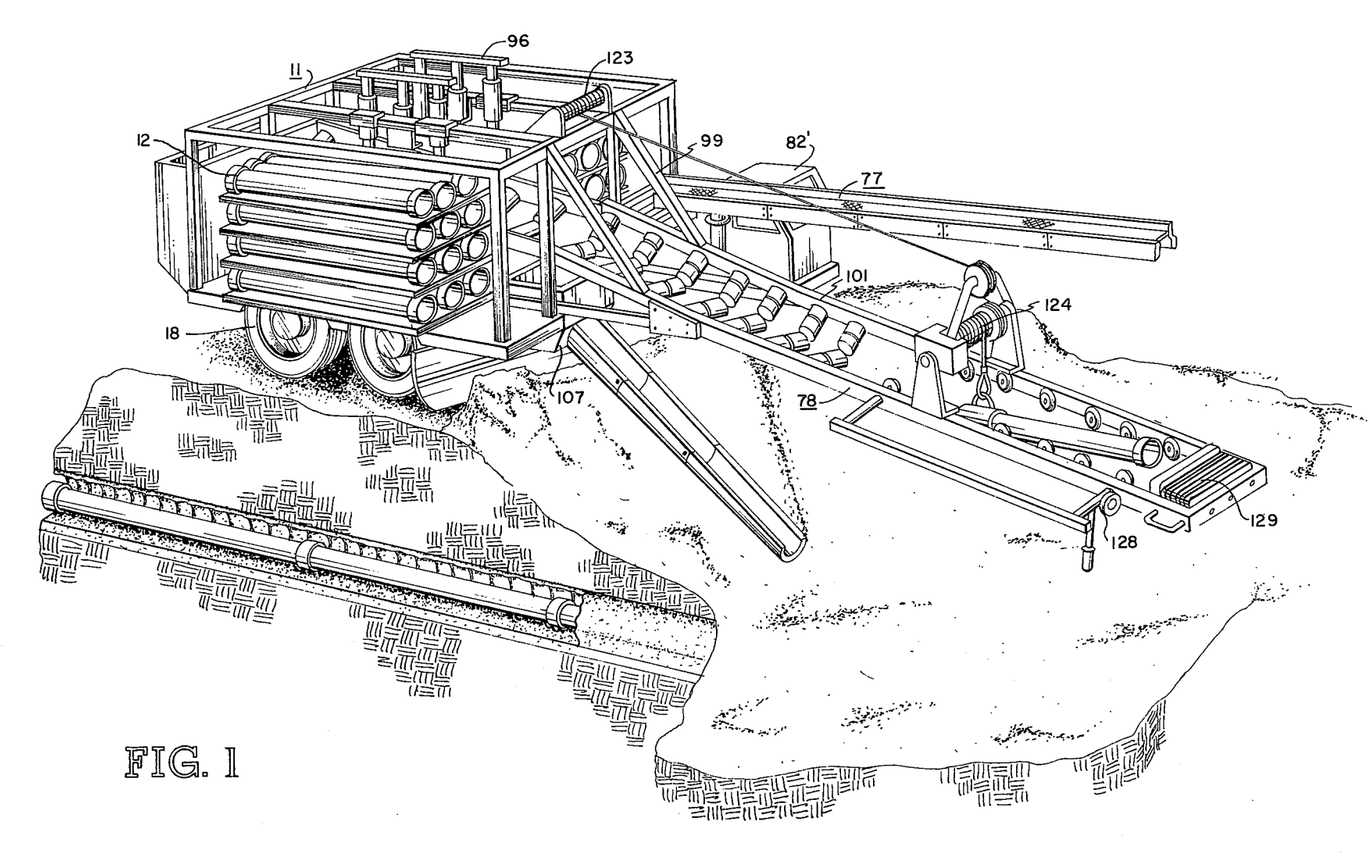
FIG. 1 is a right front perspective view of the tile carrying and service unit of this invention.
Figure 2:
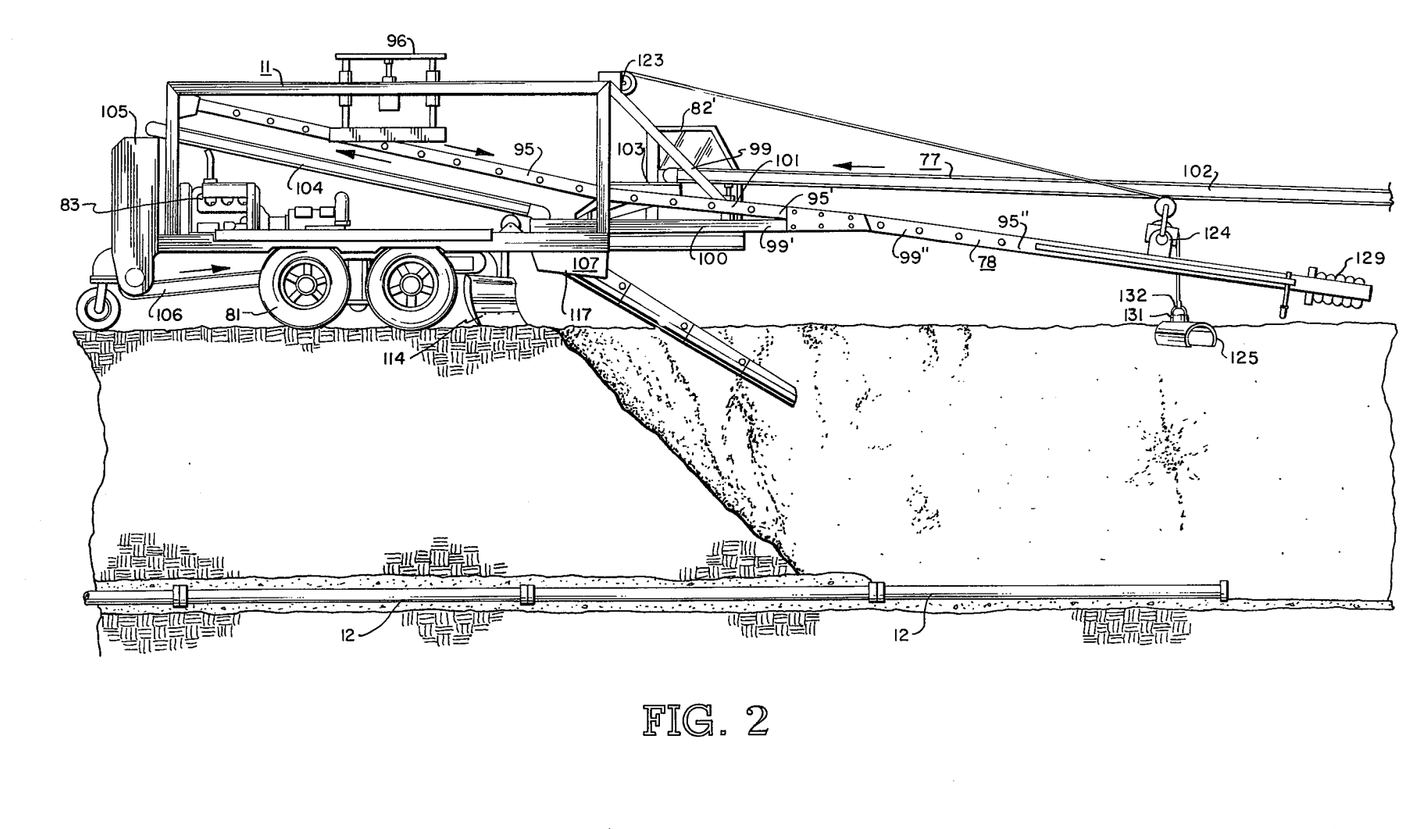
FIG. 2 is a right side elevational view of the apparatus of the FIG. 1.

Referring now to the drawings and more particularly to the FIGS. 1 and 2, the sewer laying system of this invention comprises a tile carrying and service unit, generally identified by the numeral 11. The present sewer laying system is intended to handle tiles 12 and fill material by means of the tile carrying and service unit 11.

Figure 3:
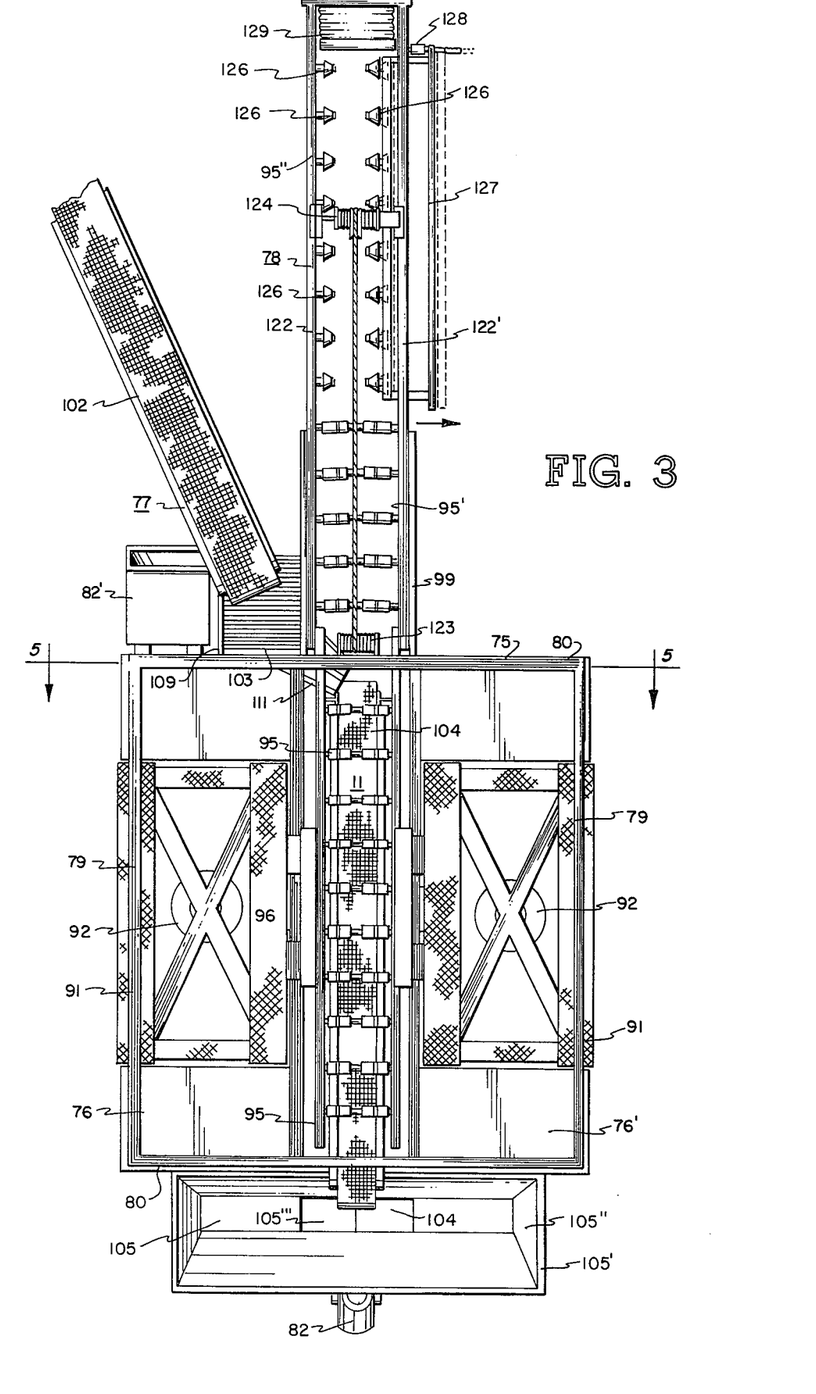
FIG. 3 is a top plan view of the tile carrying and service unit.
Figure 4:
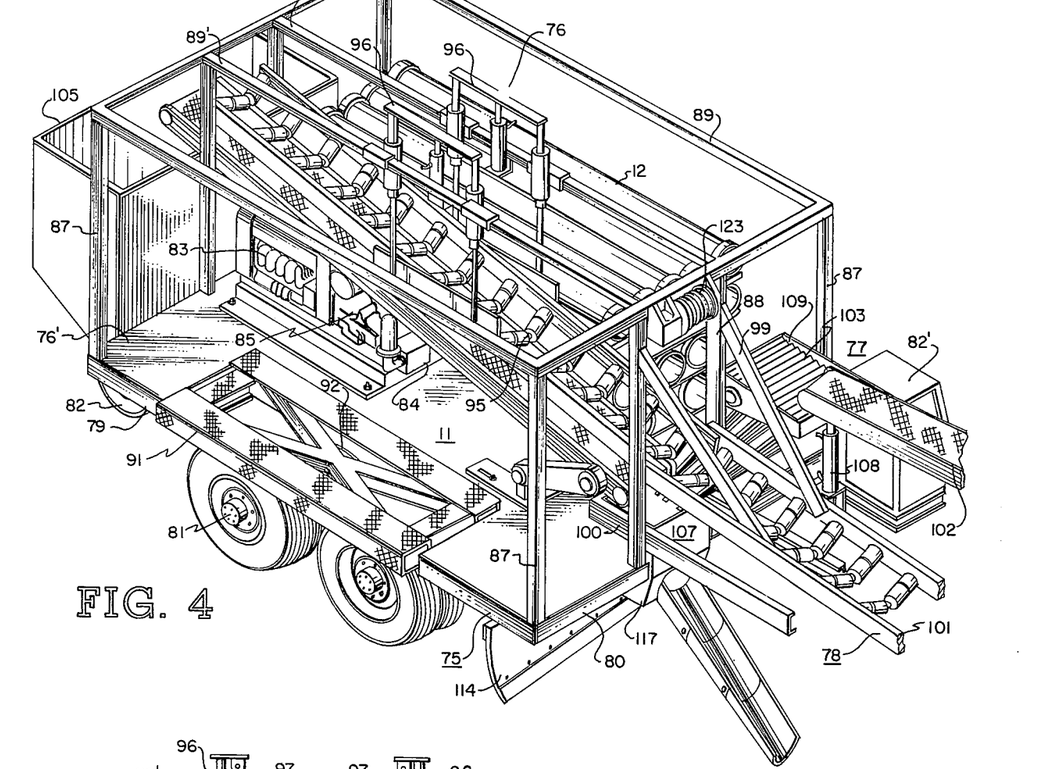
FIG. 4 is a perspective view of the tile carrying and service unit shown with the forward portion of the boom broken away for illustrative purposes.

Referring now to the FIGS. 3 and 4, the tile carrying and service unit 11 comprises a chassis 75, pipe handling bays 76 and 76', an aggregate handling group 77, and a boom group 78. The chassis 75 is a generally rectangular frame comprising a pair of rectilinear main beams 79, a plurality of crossbeams 80 fastened transversely between the beams 79, and diagonal (not shown) disposed between the beams 79 and 80 at lines of stress. The rectilinear beams 79 include supports (not shown) to which axle-mounted wheels 81 may be fastened to provide ground clearance between the lowermost terminal side of the chassis 75. The wheels 81 may be fastened distally forward of the center of gravity of the service unit 11 to conterbalance the boom 78. The chassis 75 may be provided with a steerable wheel 82 by which the travel of a self-propelled tile carrier and service unit 11 may be guided. The steerable wheel 82 may be mounted substantially centrally in the rearwardmost portion of the chassis behind the center of gravity of the unit 11. Various mechanical linkages, such as power steering (not shown), may be used to actuate the steerable wheel 82 from a cab 82' at the forward end of the unit 11.

Figure 8:
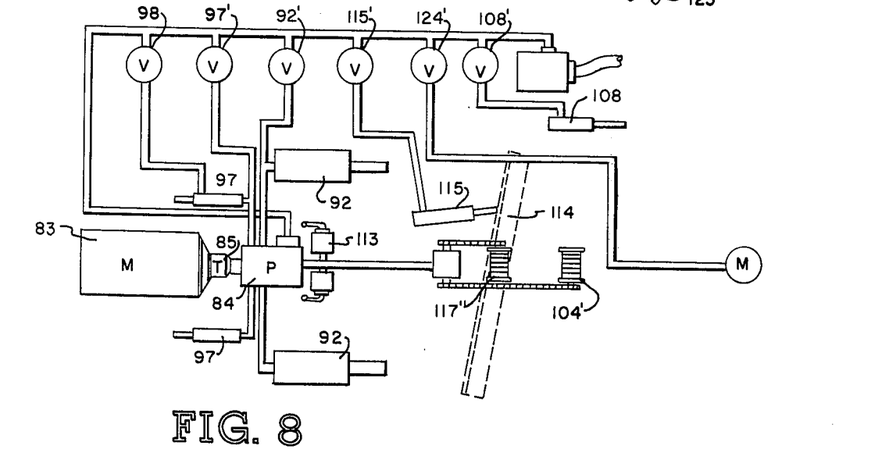
FIG. 8 is a schematic diagram of the hydraulic system of the tile carrying and service unit.

As shown in the FIGS. 4 and 8, the tile carrying and service unit 11 is provided with its main source of mechanical power by an engine, such as diesel engine 83. The diesel engine 83 may further drive a hydraulic pump 84 providing the tile setting apparatus 10 (not shown) with hydraulic fluid under pressure, as set out above, and the service unit 11 with hydraulic fluid under pressure, as shall hereinafter be described. The engine 83 may also drive wheels 81 through a common transmission 85 and generators (not shown) and similar mechanical accessories associated with such vehicles. The engine 83 is mounted rectilinearly at the rearward portion of the chassis 75 between the pipe bays 76 and 76'. The transmission 85 may be mounted distally forward of the engine 83, between the pipe bays 76 and 76' and to one side of the rectilinear center line of the chassis 75. The hydraulic pump 84 is mounted forwardly and distally above the engine 83 between the pipe bays 76 and 76'. The engine 83 may be exhaust-vented by any of a variety of means, such as a stack (not shown).

Figure 5:
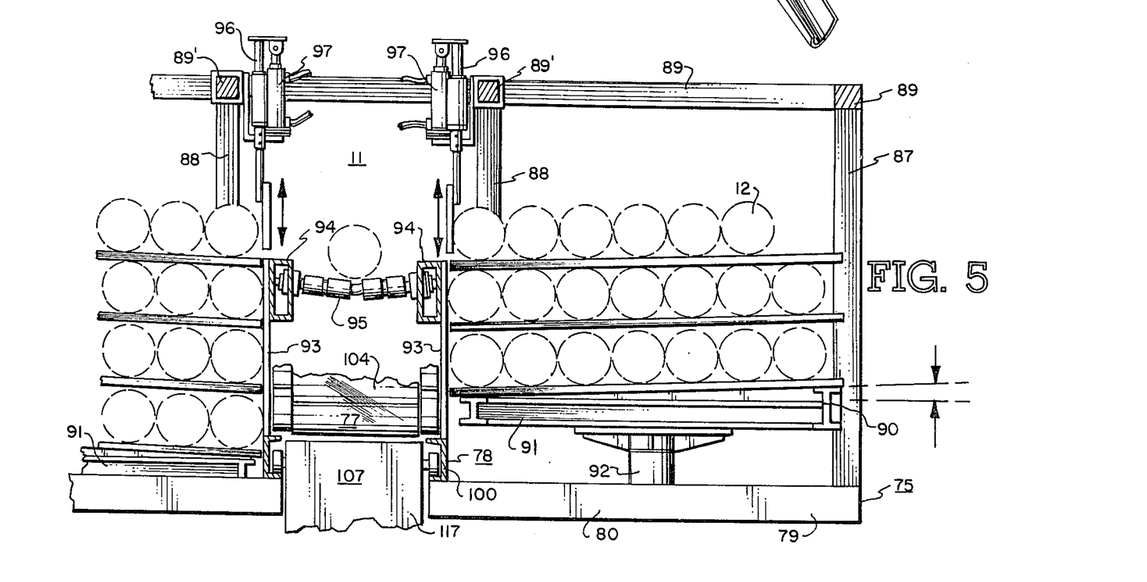
FIG. 5 is a cross-sectional view taken substantially along the lines 16—16 of the FIG. 3 showing the interior configuration thereof and, more particularly, the conveyors' power plant and aggregate handling group of this invention.

Referring now to the FIGS. 3, 4 and 5, the pipe bays 76 and 76' are regions to each side of the rectilinear center line of the chassis 76, and are defined by a plurality of upstanding cornerposts 87 issuing upstandingly from the outer rectilinear main beams 79 at the corners of the chassis 75, upstanding posts 88 of each bay 76 and 76' issuing upstandingly distally from the rectilinear center of the chassis 75. The uppermost terminal ends of the posts 87 and 88 are tied together by cross-beams 89, and the ends of the bays 76 and 76' by diagonals (not shown). A pallet 90 of tiles 12 may be laid with its rectilinear axis parallel to the rectilinear center line of the unit 11. Each of the above described bays 76 and 76' are retained by the framework set out above.

The bays 76 and 76' are operable to discharge individual lengths of pipe into the cavity between the bays 76 and 76'. As shown in the FIG. 4, each pallet 90 rests upon a platform member 91. Each of the platforms 91 is selectively raised and lowered by a hydraulic cylinder 92 connected to the pump 88 by a valve 92'. As shown in the FIG. 5, each of the platforms 91 is so disposed as to incline each of the pallets 90 at a predetermined angle downwardly toward the rectilinear center of the service unit 11. As shown more clearly by the dimension lines in FIG. 5, the interior sides of each pipe bay 76 and 76' are provided with a plurality of stay members 93 which are fastened to the chassis 75 and provide means for retaining tiles 12 on the inclined pallet 90. As shown in the FIG. 5, the stays 93 may be distally shorter than the posts 88, and the rearwardly disposed stays 93 may be progressively shorter than the forwardly disposed stays 93. The uppermost terminal ends of the stays 93 are connected by a top plate 94. The central cavity between the pipe bays 76 and 76' is provided with an inclined roller bed 95 which is disposed in a downwardly inclined alignment from the rearward to the forward end of the unit 11 contiguously between the top plates 94 connecting the respective stays 93. An upstanding knife-type retainer 96 is upstandingly mounted distally above each of the plates 94 on a portion of the chassis 75. The retainer 96 is operable to selectively retain the tile 12 closest the rectilinear center of the unit 11 in the uppermost layer of tile 12 in each pallet 90. The retainer 96 is selectively activated downwardly by a hydraulic cell 97 connected to the pump 84, and controlled by a valve 98 (shown in the FIGS. 5 and 8). The knife-type retainer 96 permits passage of a tile 12, and returns rapidly to a downwardly projecting position to retain the next tile 12 in the layer. In operation a pallet 90 may be loaded into a pipe bay 76 or 76' through respective terminal sides of the unit 11. The hydraulic cylinder 92 of the respective bays 76 and 76' may be actuated to position a layer of tile 12 of the pallet 90 in alignment with the roller bed 95 and the uppermost terminal ends of the retaining stays 93. The retainer 96 may be selectively actuated to dispense individual lengths of tile 12 onto the bed 95, as set out above. The released tile 12 then rolls form the pallet 90 over the top plate 94 onto the roller bed 95 to the work area. When a layer of tiles 12 is exhausted, the hydraulic cylinder 92 may be raised to a suitable position operable to dispense another layer in the pallet 90.

The forwardmost terminal end of the chassis 75 is provided with a knee-frame 99 which provides support to portions of the aggregate handling froup 77 and the boom 78. The knee-frame 99 may include a forwardly projecting structure of beams 100 fastened distally above the lowermost terminal ends of the forward posts 88. Diagonals and suitable cross-bracing may be provided to stiffen the knee-frame 99. The knee-frame 99 may be provided with a forward section of roller bed 101 which is in alignment with, and connected to, the roller bed 95, described above.

As shown in the FIG. 3, the aggregate handling group 77 comprises an incoming aggregate conveyer 102, a crusher-classifier 103, and elevater-reservoir conveyer 104, an aggregate supply bin 105, a distributing conveyer 106, shown to advantage in the FIG. 2, and bed-fines subassembly 107. The incoming conveyer 102 may be of the belt-type or of other aggregate material handling apparatus suitable to bring the aggregate material excavated from the ditchline to the tile carrying and service unit 11. The discharge end of the conveyer 102 is pivotally and arcuately supported on the knee-frame 99 by a hydraulic cylinder 108 which is connected to the pump 84 and controlled by valve means 108' and which is fastened to the uppermost terminal side of the knee-frame 99. The hydraulic cylinder 108 may be selectively actuated to raise and lower the discharge end of the conveyer 102 in response to conditions of grade elevations and terrain. The conveyer 102 may be driven by any of a variety of means (not shown) mounted on the service unit 11 or on the conveyer 102 itself. It is to be understood that spreaders and the like may be included on the conveyer 102 to provide uniformity of flow and aggregates.

The crusher-classifier 103 is operable to receive aggregate material from the incoming conveyer 102, to break and separate material for bed-fines fill (discussed above with respect to the tile setting apparatus), and as a backfill. The crusher 103 is mounted to the uppermost terminal side of the knee-frame 99 and to one side of the roller bed 95. It may be seen that the cursher-classifier 103 may be disposed under or over the roller bed 95 to permit passage of tiles 12 from the bays 76 and 76', or aggregates through the same space. Other arrangements of the roller bed 95 and aggregate handling group 77 may also be used to similar effect.

The crusher-classifier 103 is operable to crush and classify aggregates into A-fines having a predetermined mesh size and into backfill or B-fines of other rejected material. The crusher-classifier 103 includes a discharge hopper 109, grinding apparatus, and classifiers (not shown) of the type commonly associated with mechanisms of this type. The hopper 109 is provided with a pair of discharge chutes 110 and 111 through which the respective A- and B-fines pass, as shall hereinafter be described. The chute 110 issues forwardly of the chute 111 into the discharge hopper 109. The rearward B-fines chute 111 discharges onto the elevating conveyer 104 to be carried to the aggregate supply bin 105.

The elevating conveyer 104 is an upwardly inclined, from front to rear with respect to the unit 11, belt-type Rollers 126 of the roller bed 95" are journally mounted distally at intervals on a bar 127, which in turn is fastened transversely on the interior terminal side of one of the rectilinear beams 122 and to the opposite beam 122'. Each of the rollers 126 are bifurcated into opposingly disposed sections which have a frustro-conical configuration to contact a pair of arc portions in the lower circumference of a tile 12 on the inclined faces of the respective opposing roller portions 126. The bar 127 is mounted on pivotal eccentrics 128 which are operable to actuate and lock the bar 127 outwardly with respect to the rectilinear center of the boom 78 sufficiently to permit a tile 12 to pass between the rollers 126. Eccentrics 128 may be actuated by any of a variety of means, such as mechanical linkages or hydraulic cylinders. The rearward side of the lowermost terminal end of the boom 78 is provided with a bumper 129 which is operable to receive force from a downwardly travelling tile 12 and to retain the tile 12 on the uppermost terminal side of the boom 78 on the roller bed 95". The bar 127 may be actuated by means of the eccentric 128 to permit the tile 12 resting against the bumper 129 to pass between the respective sets of rollers 126.

The tile 12 resting on the boom 78 may be received and lowered into position by the winch 124. The operative terminal end of the winch 124 may be provided with a commonly known pipe and handling clamp 125 mounted on swivels 131 connected to the shackle 132 of the cable of the winch 124. It may be seen that a tile 12 may be discharged from one of the tile handling bays 76 or 76' onto the roller bed 95, as set out above, and pass over the bed 95', over the bed 95", to be received by the bumper 129. An operator may then connect the clamp 130 to the tile 12, and the eccentrics 128 may be actuated to permit the tile 12 to pass between the rectilinear beams 122 and 122'. The cable-mounted clamps 130 may be used in the manner of commonly known cable lifts to position and install the tile 12 in a pipeline.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A tile carrying and service unit, comprising; a chassis having a framework and supporting wheels; pipe handling bays being regions disposed to each side of the rectilinear center line of said chassis defined by upstanding posts issuing upwardly from said chassis, each of said pipe bays having a platform on which tiles rest which are inclined transversely with respect to said chassis, means for conveying tiles discharged transversely from said pipe bay platforms to a point distally from said chassis; and
    lift means for said platforms, and means for discharging individual tiles from the uppermost layer of tiles in each of said pipe bays, which has been disposed to discharge to said means conveying said tile discharged from said pipe bays out of said unit.

2. The apparatus of claim 1 wherein said pipe bay platforms are inclined into a cavity at the rectilinear center of said chassis, and said means for conveying tiles from said pipe bays includes a portion disposed in said cavity.

3. The apparatus of claim 1 wherein said pipe bays receive palleted tiles disposed rectilinearly on said platform.

4. The apparatus of claim 1 including lift means for said platforms, and means for discharging individual tiles from the uppermost layer of tiles in each of said pipe bays, which has been disposed to discharge to said means for conveying said tile from said pipe bays.

5. The apparatus of claim 2 wherein each of said pipe bays is provided with mechanical means for controlling discharge of tiles from said pipe bays to said means for conveying tiles.

6. The apparatus of claim 5 wherein said means for controlling discharge of tile is a selective controllable knife-type retainer mounted to said chassis adjacent to the lowermost terminal edge of said platform at the side adjacent said means for conveying tiles.

7. The apparatus of claim 1 including means for steering said unit mounted to said chassis.

8. The apparatus of claim 7 wherein said supporting wheels are mounted forwardly of the center cavity of said unit, and a steerable wheel is mounted distally rearward of said supporting wheels to said chassis.

9. The apparatus of claim 1 including an engine power plant.

10. The apparatus of claim 9 wherein said engine is provided with a transmission providing self-propulsion to said unit.

11. The apparatus of claim 1 including a vertically pivoting boom group having a pair of rectilinearly disposed beams mounted on a suitable portion of the forwardmost terminal end of said unit chassis, and means for selectively pivoting said boom with respect to said chassis.

12. A tile carrying and service unit, comprising;
    a chassis having a framework and supporting wheels;
    pipe handling bays being regions disposed to each side of the rectilinear center line of said chassis defined by upstanding posts issuing upwardly from said chassis, each of said pipe bays having a platform on which tiles rest which are inclined transversely with respect to said chassis;
    and means for conveying tiles discharged transversely from said chassis; and a vertically pivoting boom group having a pair of rectilinearly disposed beams mounted on a suitable portion of the forwardmost terminal end of said unit chassis, and means for selectively pivoting said boom with respect to said chassis;
    and said boom group is provided with a roller bed connected to and in alignment with a roller bed for conveying tiles from said pipe bays.

13. The apparatus of claim 12 wherein said roller bed on said boom is provided with means for controlling travel of a tile on said roller bed.

14. The apparatus of claim 13 wherein said beams for controlling a tile is a resilient bumper mounted to the terminal end opposite said chassis of said boom to receive force from a tile passing along said roller beds.

15. The apparatus of claim 12 wherein rollers in a suitable portion adjacent the terminal end of said boom are bifurcated and include means respectively actuating said roller portions apart to permit passage of a tile through said roller bed portion between said bifurcated rollers.

conveyer mounted in the cavity between the pipe bays 76 and 76' over the power elements 83, 84 and 85. It may be seen that other material handling conveyers may be used for similar effects as the belt-type elevating conveyer 104. It is to be understood that the elevating conveyer 104 is disposed substantially distally parallel under the roller bed 95. The elevating conveyer 104 is driven in an upward, rearward direction by means such as mechanical linkages (not shown) connected to the engine 83 by a transmission 112. The rearwardmost terminal end of the elevating conveyer 104 is operable to discharge aggregate into the uppermost terminal end of the aggregate supply bin 105. It may also be seen that the elevating conveyer 104 may be shiftably mounted to permit the conveyer 104 to extend rearwardly of the bin 105 to spread aggregate directly to the ground or to auxilliary apparatus.

Aggregate supply bin 105 is mounted at the rearward portion of the chassis 75 to the rearward corner posts 87 and center posts 88. The supply bin 105 is a hopper-like container open at its top and bottom having upstanding side walls 105' and inwardly inclined accumulating walls 105'' fastened at the rearwardmost terminal ends of the side walls 105'. The lowermost terminal ends of the supply bin 105 may be closed by doors 105''' of the type commonly associated with aggregate hoppers and the like.

As shown in the FIG. 2, the distributing conveyer 106 is an upwardly inclined, from aft to forward with respect to the unit 11, belt-type conveyer disposed rectilinearly in alignment with and distally below the cavity between the pipe bays 76 and 76'. The distributing conveyer 106 is operable to receive aggregate from the lowermost terminal end of the supply bin 105 and to carry it forwardly to a point distally rearward of the forwardmost terminal end of the chassis 75, thus backfilling the ditchline portion having installed and partially covered the tile 12. The distributing conveyor 106 is disposed below the engine 83 and under the lowermost terminal end of the supply bin 105 at its rearwardmost terminal end, and over the axle (not shown) of the wheels 81 and distally below the lowermost terminal edge of the chassis 75 at its forwardmost end. The distributing conveyer 106 is driven by the engine 83 through a variety of mechanical linkages such as a transmission 113, shown in the FIG. 8. The distributing conveyer 106 may also be disposed off center in the cavity between the bays 76 and 76' to permit operation of the linkage connecting the transmission 85 and the engine 83, set out above. It may be seen that the distributing conveyer 106 may be shiftably mounted to permit the conveyer 106 to extend forwardly to the bedfines subassembly 107 to supply reserve aggregate as required for the tile setting apparatus 10 (not shown).

A moldboard 114 may be mounted distally forward of the wheels 81 to the lowermost terminal side of the chassis 75. The moldboard 114 may be adjustably actuated by a hydraulic cell 115 connected to the pump 84 and controlled by a valve 115'.

The forward A-fines chute 110 of the crusher-classifier 103 is operable to discharge A-fines to the bedfines subassembly 107. It may be seen that by closing the chute 110 surplus aggregate material may be discharged to the elevating conveyer 104 and may be used in the manner of other material set out above. The bed-fines subassembly 107 is operable to carry A-fines from the crusher-classifier 103 to the cars 14 and 15 of the tile setting apparatus 10. The bed-fines subassembly 107 comprises a hopper 117 into which class A fines may be discharged and from which fines may pass to the hopper cars 14 and 15. As shown in the FIG. 6, the hopper 117 is mounted to the lowermost terminal side of the knee-frame 99 on rails 99'. The hopper 117 is open at its top and bottom, having upstanding side walls 118 and centrally inclined accumulator walls 119 fastened to the lowermost terminal ends of the side walls 118. Doors (not shown) of the type commonly associated with aggregate hoppers and the like may be provided at the lowermost terminal end of the accumulator walls 119. Aggregates may be communicated from the hopper 117 to the cars 14 and 15 by an open-top substantially U-shaped chute 120 which is pivotally and articulatingly mounted to the forward side of the lowermost terminal end of the hopper 117. The chute 120 is provided with means for selectively changing its angle of inclination with respect to the chassis 75, such as a hydraulic cylinder (not shown) mounted between the knee-frame 99 and the chute 120. The chute 120 may also be provided with a mechanically slidable extending means (not shown) of the sort associated with aggregate handling chutes and the like.

Figures 6, 7:
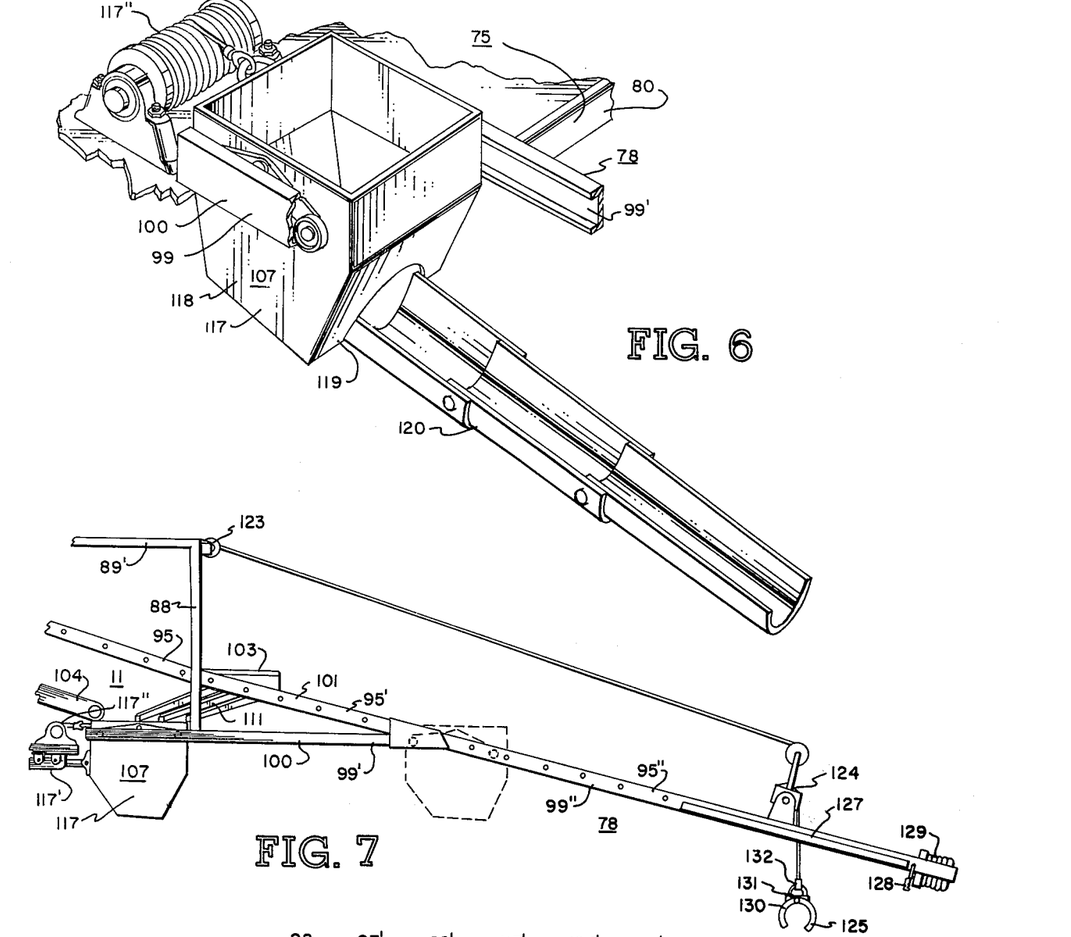
FIG. 6 is a right front perspective view of the backfill hopper of this invention shown mounted to the lower, central portion of the forward end of the tile carrier, and shown with a chute.
FIG. 7 is a side elevational view of a further embodiment of the backfill hopper operable to ride on the knee-frame and boom.

As shown in the FIG. 7, a further embodiment of the boom group 78 includes the track-mounted hopper car 117 which rides over track-like rails 99' of the knee-frame 99 to rails 99'' along the boom 78. The hopper frame 117 may be actuated along the tracks 99' and 99'' by any of a variety of mechanical means, such as hydraulic motors, winches, and the like, to first justaposition the hopper 117 under the forced A-fines chute 110, and then to juxtaposition the hopper 117 over the respective hopper cars 14 and 15 of the tile setting apparatus 10. One actuator means may include a pressure or coil spring 117' mounted on the chassis 75 to engage and compress when the hopper 117 is at its upper parked or "loading" position, and operable to push the hopper 117 forwardly along the track 99' until downward inclination of the tracks 99' and 99'' causes the hopper 117 to coast to the proper location. The actuator means 117' may also include a winch 117'', also mounted to the chassis 75, behind the upper loading position of the hopper 117. The winch 117'' is connected to the hopper 117 by a shackle (not shown). It may be seen that the winch 117'' may be employed both as a means for raising the hopper 117 and as a brake means as the hopper 117 is lowered. It may also be seen that a variety of commonly known rigging arrangements may be used in the track-mounted hopper 117.

Referring to the FIGS. 3 and 7, the boom group 78 is intended to provide a tile handling and lift means for tiles 12, and may support forward portions ot the chute 120. The boom group 78 comprises a pair of rectilinear beams 122 and 122' mounted for vertical pivoting at the forwardmost terminal ends to the knee-frame 99, a boom actuating winch 123, a roller bed 95'', and a tile lifting winch 124. The vertical, angular deflection of the boom 78 may be selectively controlled by the winch 123 which is between the boom 78 and the knee-frame 99. The winch 123 may be driven by a hydraulic motor, or by mechanical connection to the eingine 83. It may be seen that the track-mounted embodiment of the hopper 117 may be fabricated with the track-rails 99'' fastened to the beams 122 and 122'. The roller bed 95'' is generally mounted between the rectilinear beams 122 and 122', and connected in alignment with the forwardmost terminal end of the roller bed section 95'.

16. The apparatus of claim 15 wherein roller portions are mounted to a bar which is fastened to slide transversely on the interior terminal side of one of said beams, and means for actuating said bar with respect to said boom.

17. The apparatus of claim 15 wherein said bifurcated roller portions each have a frustro-conical configuration.

18. A tile carrying and service unit, comprising;
a chassis having a framework and supporting wheels;
and pipe handling bays being regions disposed to each side of the rectilinear center line of said chassis defined by upstanding posts issuing upwardly from said chassis, each of said pipe bays having a platform on which tiles rest which are inclined transversely with respect to said chassis;
and means for conveying tiles discharged transversely from said pipe bay platforms to a point distally from said chassis; and
an aggregate handling group having a classifier connected to a continuous source of aggregate material, and a fines subassembly having a hopper, and having means for communicating aggregates from said hopper to the work area in a ditch line.

19. The apparatus of claim 18 wherein said classifier is provided with a discharge chute communicating selected fines from said classifier to said hopper and communicating surplus aggregate and rejected aggregate away.

20. The apparatus of claim 18 wherein said fines subassembly includes a discharge hopper fastened to a portion of said chassis, and having a suitable chute connected thereto.

21. The apparatus of claim 18 wherein said fines subassembly includes a hopper car mounted on tracklike rails on a portion of said chassis and on a pivotally mounted boom at the forwardmost terminal end of said chassis, said fines subassembly including means for actuating said car along said rails.

22. The apparatus of claim 21 wherein said means for actuating said hopper car include a spring urging means which is compressed when said car is in its parked, loading position and which urges said car forwardly along said rails, and a winch connected to said car for raising said car along said rails.

23. The apparatus of claim 18 including a moldboard mounted below said chassis distally forward of said support wheels.

24. The apparatus of claim 23 wherein said moldboard is controllable with respect to the chassis.

25. The apparatus of claim 18 including an elevating conveyer communicating aggregate from said classifier to a point rearwardly out of said chassis.

26. The apparatus of claim 25 including a supply bin fastened at the rearwardmost terminal end of said chassis below the discharge of said elevating conveyer, and a distributing conveyer communicating aggregate from the lowermost discharge end of said supply bin into a point distally rearward of the forwardmost terminal end of said chassis.

27. The apparatus of claim 25 wherein said elevating conveyer is selectively shiftable to communicate aggregates either to said supply bin or to a point distally rearward of said supply bin.

28. The apparatus of claim 25 wherein said distributing conveyer is selectively shiftable such that the discharge may communicate either with said hopper or to a point distally rearward of said hopper.

29. The apparatus of claim 25 wherein said elevating conveyer is disposed centrally between said pipe bays and under said means conveying said tiles from said pipe bays.

30. The apparatus of claim 25 wherein said distributing conveyer is disposed centrally between said pipe bays and under said chassis and above said support wheels, and wherein said distributing conveyer is disposed centrally in said chassis beween said wheels below said pipe bay platforms.

31. The apparatus of claim 30 wherein an engine providing mechanical power to said service unit is mounted between said pipe bays and between said elevating conveyer and said chassis.

32. The apparatus of claim 25 wherein the lowermost, discharge end of said bin includes selectively closable doors.

33. The apparatus of claim 25 wherein said classifier includes a distributing chute having means for selectively closing said access to said hopper to divert all aggregate material away from said hopper.

34. The apparatus of claim 18 wherein said classifier includes crusher apparatus.

* * * * *